United States Patent
Ellenberg et al.

(10) Patent No.: US 7,827,086 B1
(45) Date of Patent: Nov. 2, 2010

(54) SYSTEM AND METHOD FOR CONDUCTING A CUSTOMER AFFINITY PROGRAM AUCTION

(75) Inventors: Jonathan Ellenberg, Bridgewater, NJ (US); Josh Nabozny, Manalapan, NJ (US)

(73) Assignee: Bank of America Corporation, Charlotte, NC (US)

( * ) Notice: Subject to any disclaimer, the term of this patent is extended or adjusted under 35 U.S.C. 154(b) by 2730 days.

(21) Appl. No.: 09/624,439

(22) Filed: Jul. 24, 2000

(51) Int. Cl.
*G06Q 40/00* (2006.01)
(52) U.S. Cl. .............................. 705/37; 705/35; 705/14
(58) Field of Classification Search .................. 705/37, 705/26, 14, 35
See application file for complete search history.

(56) References Cited

U.S. PATENT DOCUMENTS

| | | | |
|---|---|---|---|
| 4,637,614 A | 1/1987 | Gibbon et al. | |
| 4,890,842 A | 1/1990 | Plange | |
| 5,025,372 A | 6/1991 | Burton et al. | |
| 5,056,019 A | 10/1991 | Schultz et al. | |
| 5,537,314 A | 7/1996 | Kanter | |
| 5,689,100 A | 11/1997 | Carrithers et al. | |
| 5,774,870 A | 6/1998 | Storey | |
| 5,794,207 A | 8/1998 | Walker et al. | |
| 5,794,219 A | 8/1998 | Brown | |
| 5,890,138 A | 3/1999 | Godin et al. | |
| 5,905,974 A | 5/1999 | Fraser et al. | |
| 5,905,975 A | 5/1999 | Ausubel | |
| 5,915,244 A | 6/1999 | Jack et al. | |
| 5,923,016 A | 7/1999 | Fredregill et al. | |
| 5,983,196 A | 11/1999 | Wendkos | |
| 6,006,201 A | 12/1999 | Berent et al. | |
| 6,009,412 A | 12/1999 | Storey | |
| 6,012,039 A | 1/2000 | Hoffman et al. | |
| 6,012,045 A | 1/2000 | Barzilai et al. | |
| 6,021,398 A | 2/2000 | Ausubel | |
| 6,023,685 A | 2/2000 | Brett et al. | |
| 6,023,686 A | 2/2000 | Brown | |
| 6,041,308 A | 3/2000 | Walker et al. | |
| 6,044,362 A | 3/2000 | Neely | |
| 6,049,778 A | 4/2000 | Walker et al. | |
| 6,178,408 B1 * | 1/2001 | Copple et al. ................. 705/14 |
| 6,415,269 B1 * | 7/2002 | Dinwoodie ............... 705/36 R |
| 6,594,640 B1 * | 7/2003 | Postrel ......................... 705/14 |
| 6,606,608 B1 * | 8/2003 | Bezos et al. .................. 705/37 |
| 7,152,042 B1 * | 12/2006 | Arkes .......................... 705/37 |

OTHER PUBLICATIONS

Auction-Anything website (www.auctionanything.com).*
My Points websites (www.mypoints.com).*

* cited by examiner

*Primary Examiner*—Daniel S Fleten
(74) *Attorney, Agent, or Firm*—Baker Botts L.L.P.

(57) ABSTRACT

A system and method is described that allows customers to bid on the goods or services using reward points earned through a customer affinity program. The system and method also allows the customers to purchase additional reward points for use in the auction. A specific quantity of reward points may be purchased by the customer for use in the auction or the customer may choose to bid on goods and services in excess of his earned reward points and pay for the additional reward points after the auction is completed. Alternatively, the customer may convert reward points to a cash value for use in the auction. The auction may be customized or targeted to a particular group of customers.

57 Claims, 17 Drawing Sheets

Fig. 3

Customer Database 280

| Customer ID 310 | Customer Password 320 | Customer Name and Address 330 | Registration Date 340 | Personal Identifier 350 | Credit Card No. (Exp'n Date) 360 | Debit Card No. (Bank) 370 |
|---|---|---|---|---|---|---|
| 123456 | 7890 | John Smith 123 Park Avenue NY, NY 12345 jsmith@msn.com | 6/1/98 | Mother's Maiden Name = Doe | 1234 5678 9012 3456 (12/00) | 123-456-789 (1st Nat'l) |
| ... | ... | ... | ... | ... | ... | |

Fig. 4

Reward Points Database 282

| Customer ID 410 | Customer Name 420 | Current Reward Points Balance 430 | Additional Non-Provider Reward Points 440 | Reward Points Available for Purchase 450 |
|---|---|---|---|---|
| 123456 | John Smith | 25,000 | 5,000 | 25,000 |
| ... | ... | ... | ... | ... |

Fig. 5

Merchandise Database 284

| Item Code 510 | Description 520 | Available Units 530 |
|---|---|---|
| 0001 | Sporting Event Ticket | 10 Tickets |
| 0002 | Fine French Wine | 2 bottles |
| ... | ... | ... |

Fig. 6

Pricing Database 286

| Item Code 610 | Description 620 | Cost to Provider 630 | Popularity of Item 640 | Period of usage 650 | Type of Auction 660 | Auction Pricing Discount Factor 670 | Minimum Opening Bid 680 | Bid Increment 690 |
|---|---|---|---|---|---|---|---|---|
| 0001 | Sporting Event Ticket | $125.00 | high | moderate | normal | 60% | 5,000 pts $75 | 1,000pts $15 |
| 0001 | Sporting Event Ticket | $125.00 | high | peak | peak usage | 33% | 2,750 pts $40 | 500 pts $7.50 |
| 0002 | Fine French Wine | $500.00 | moderate | moderate | luxury | 75% | 25,000 pts $375 | 5,000 pts $75 |
| ... | ... | ... | ... | ... | ... | ... | ... | ... |

Fig. 7A

Offer Database 288

| Customer ID 710 | Offer No. 720 | Item Code 730 | Minimum Opening Bid 740 | Bid Increment 750 | Opening Bid Date 760 | Auction Cutoff Date 770 | Customer Opening Bid 780 | Customer Latest Bid 790 |
|---|---|---|---|---|---|---|---|---|
| 123456 | 234567 | 0001 | 5,000 | 100 | 7/1/00 | 7/10/00 | 5,000 | 6,000 |
| 345678 | 456789 | 0002 | 25,000 | 500 | 8/1/00 | 8/30/00 | 25,500 | 30,500 |
| ... | ... | ... | ... | ... | ... | ... | ... | ... |

Fig. 7B

Offer Database 288

| Highest Bid 792 | Offer No. 794 | Customer ID 796 |
|---|---|---|
| 6000 | 234567 | 123456 |
| ... | ... | ... |

Fig. 8

Currency Database 290

| Customer ID | Current Reward Points Balance | Reward Points Available For Purchase | Cost to Purchase Reward Points (USD) | Costs to Purchase Reward Points (Francs) | Cost to Purchase Reward Points (Euro) |
|---|---|---|---|---|---|
| 123456 | 25,000 | 25,000 | .01/pt = 250 | .06/pt = 1500 | .01/pt = 250 |
| ... | ... | ... | ... | ... | ... |

Customization Database 292

| Customer ID 910 | Geographic Code 920 | Customer Profession 930 | Customer Interests 940 | Previous Reward Redemptions 950 |
|---|---|---|---|---|
| 123456 | New York City Metropolitan Area | Teacher | Sporting Events | Baseball Tickets |
| 345678 | Washington, D.C. Metropolitan Area | Lawyer | Food and Wine | Fine Wine |
| ... | ... | ... | ... | ... |

Fig. 10

Fulfillment Database 294

| Customer Id 1010 | Customer Name And Address 1020 | Product 1030 | Delivery 1040 |
|---|---|---|---|
| 123456 | John Smith<br>123 Park Avenue<br>N.Y., N.Y. 123456<br>jsmith@msn.com | Sporting Event Ticket | Ground Service |
| . . . | . . . | . . . | . . . |

US 7,827,086 B1

SYSTEM AND METHOD FOR CONDUCTING A CUSTOMER AFFINITY PROGRAM AUCTION

FIELD OF THE INVENTION

The invention relates to customer affinity programs and, in particular, to a system and method for conducting an auction using "reward points."

BACKGROUND

There are a variety of customer affinity programs where customers can earn reward points through the purchase of goods and services from a supplier and can later redeem those points for additional goods or services. Well-known examples of customer affinity programs include airline "frequent flyer" programs and credit card "reward" programs. In a frequent flyer program, a customer receives frequent flyer "miles" for traveling on a particular airline which can be redeemed for future travel on the airline. Similarly, in a credit card reward program, reward "points" or "dollars" are earned by use of a credit card to make purchases which can be redeemed through the credit card company for goods or services from a variety of suppliers.

Customer affinity programs, as the name implies, are programs that suppliers of goods or services use to develop and maintain customer loyalty. Customers earn reward points through purchase of the goods or services from a supplier. Suppliers frequently offer promotions where additional points are given based on certain criteria (e.g. volume or types of purchases). The customers can track their reward points through, for example, periodic mailings from the supplier or on the supplier's internet site. Watching reward points grow creates customer excitement and helps to develop and maintain customer loyalty. Customers are further encouraged to continue using a supplier by the goods or services that can be obtained by redeeming reward points.

SUMMARY

The system and method for conducting a customer affinity program auction described includes a central server that maintains databases and is connected to customer interfaces to conduct auctions of goods or services.

Customers can bid on the goods or services using reward points earned through a customer affinity program. The system and method also allows the customers to purchase additional reward points for use in the auction. A specific quantity of reward points may be purchased by the customer for use in the auction or the customer may choose to bid on goods and services in excess of his earned reward points and pay for the additional reward points after the auction is completed. Alternatively, using the system and method, the customer can convert his reward points to a cash value and bid in cash on an item being auctioned. The auction may be customized or targeted to a particular group of customers.

The system and method also can determine a minimum bid price and bid increment for the auction of the goods or services.

SUMMARY OF THE DRAWINGS

FIGS. 3-10 show embodiments of representative databases used with the system and method.

DETAILED DESCRIPTION OF THE PREFERRED EMBODIMENTS

Figure 1:
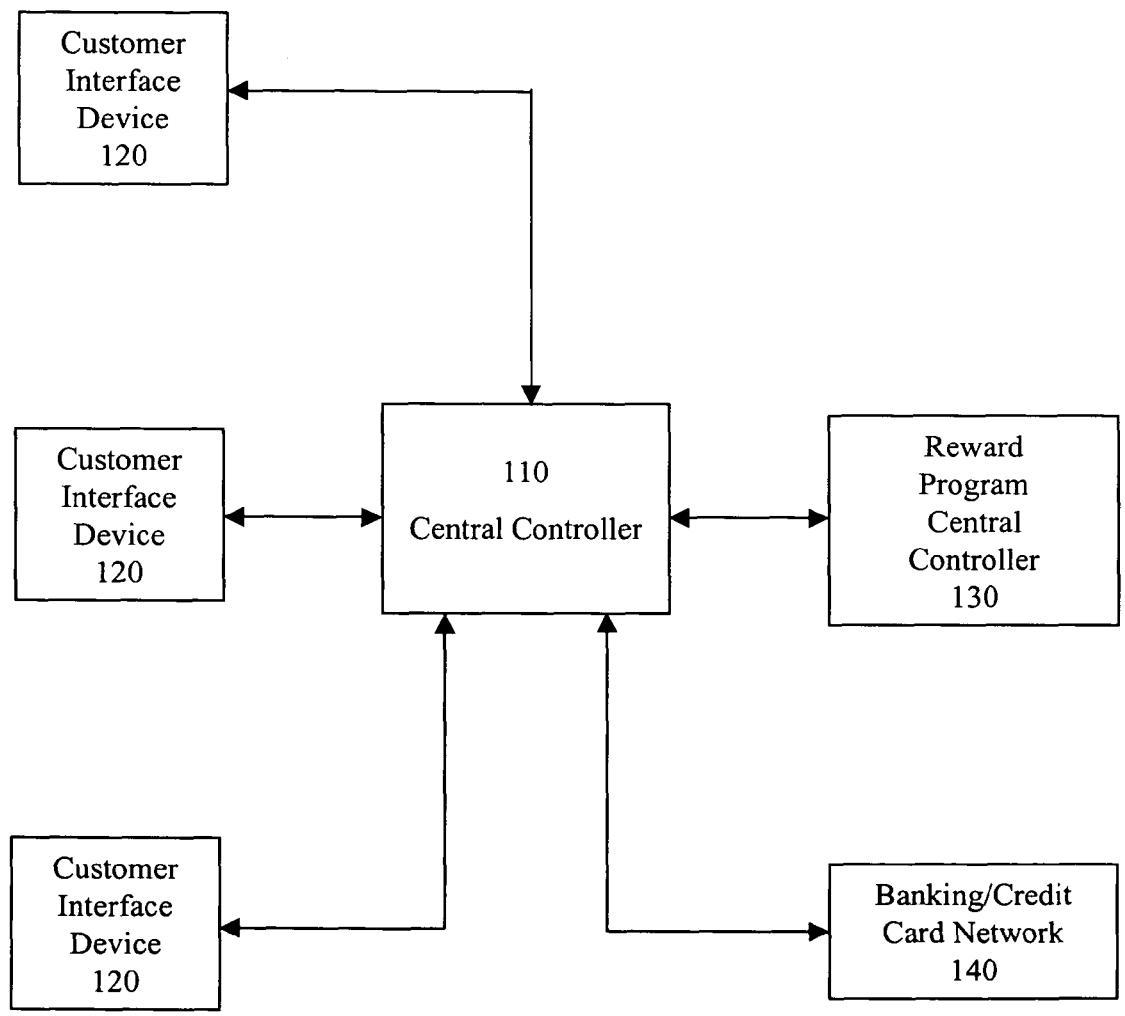
FIG. 1 shows an embodiment of the parties connected through the system and method.

As shown in FIG. 1, the system and method generally includes a central controller 110 which is connected to customer interface devices 120, a reward program central controller 130, and a banking/credit card network 140. As is described more fully in the following paragraphs, the central controller 110 places an item on the "auction block" and sets a minimum bid price and a bid increment for the item. Customers at customer interface devices 120 can bid on the item using reward points they have accumulated as part of a customer affinity program and may purchase additional reward points for use in the auction. Alternatively, using the system and method, customers can convert reward points to a cash value and bid in cash on items being auctioned.

Central controller 110 communicates with reward program central controller 130 to determine the available balance of reward points of a particular customer wanting to bid on an item. If the reward points needed to bid on the item exceed the reward points available in the customer balance, the customer may purchase additional reward points at an exchange rate or convert reward points available to a cash value for use in the auction. The central controller will interact with the banking/credit card network 140 to allow for payment for the additional reward points purchased by the customer or to allow for partial cash payment for items purchased with cash bids in the auction.

Figure 2:
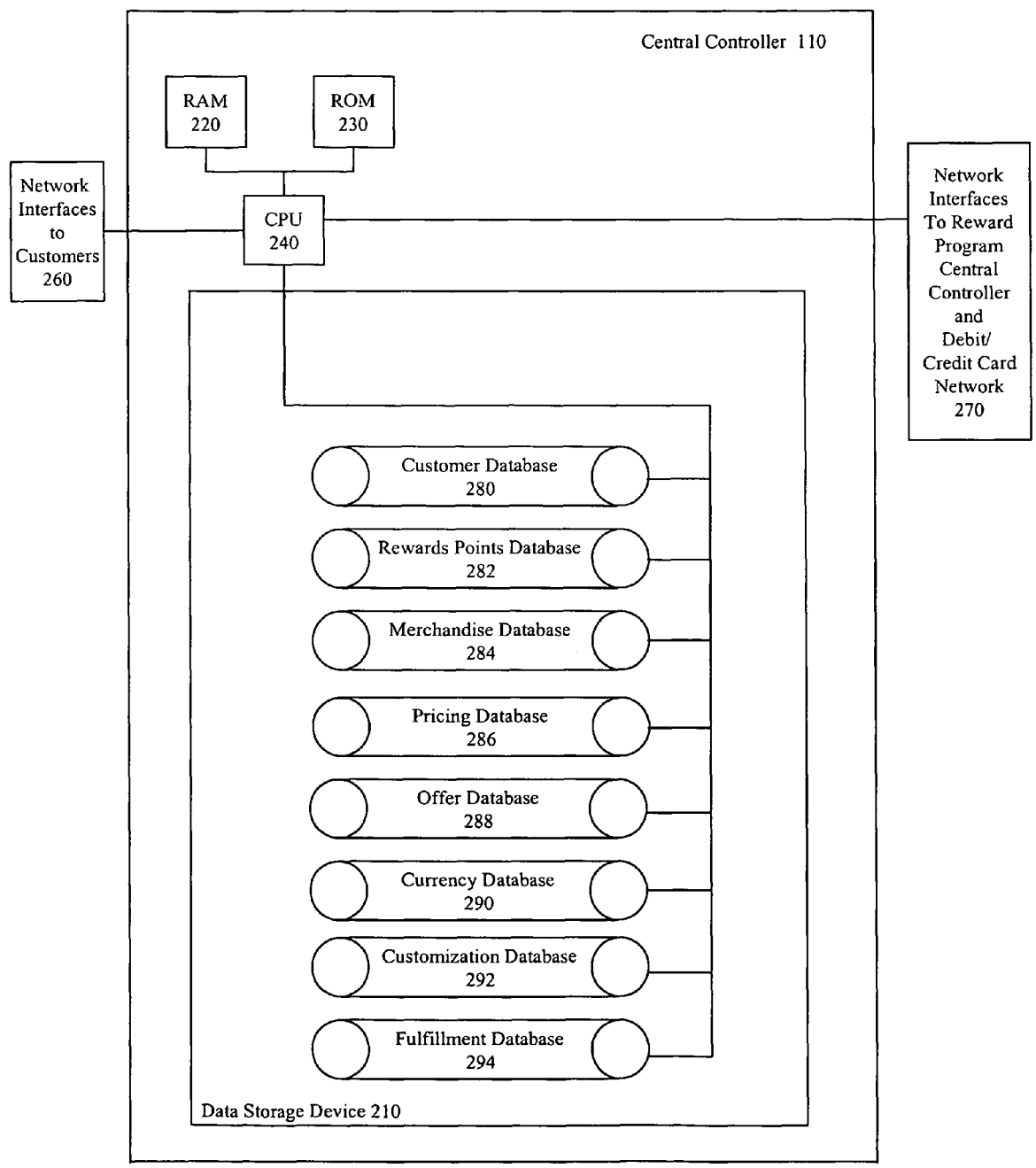
FIG. 2 shows an embodiment of a representative central controller used with the system and method.

FIG. 2 shows an embodiment of a general-purpose computer used with the system and method. Central controller 110 includes data storage device 210, random access memory ("RAM") 220, read only memory ("ROM") 230 and central processing unit ("CPU") 240. The data storage device 210 conceptually includes a number of databases including, for example, a customer database 280, a reward point database 282, a merchandise database 284, a pricing database 286, an offer database 288, a currency database 290, a customization database 292 and a fulfillment database 294. The databases are discussed in more detail below in reference to FIGS. 3-14.

CPU 240 is also connected to network interfaces 260, which enable CPU 240 to connect to the customer interface devices 120. Network interfaces 270 enables the CPU 240 to connect to the reward programs central controller 130 and the banking/credit card network 140.

It should be noted that while the central controller 110 and reward program central controller 130 are shown as separate computers in FIG. 1, the functions performed by each may be consolidated into a single controller or further distributed among additional controllers.

Figure 11:
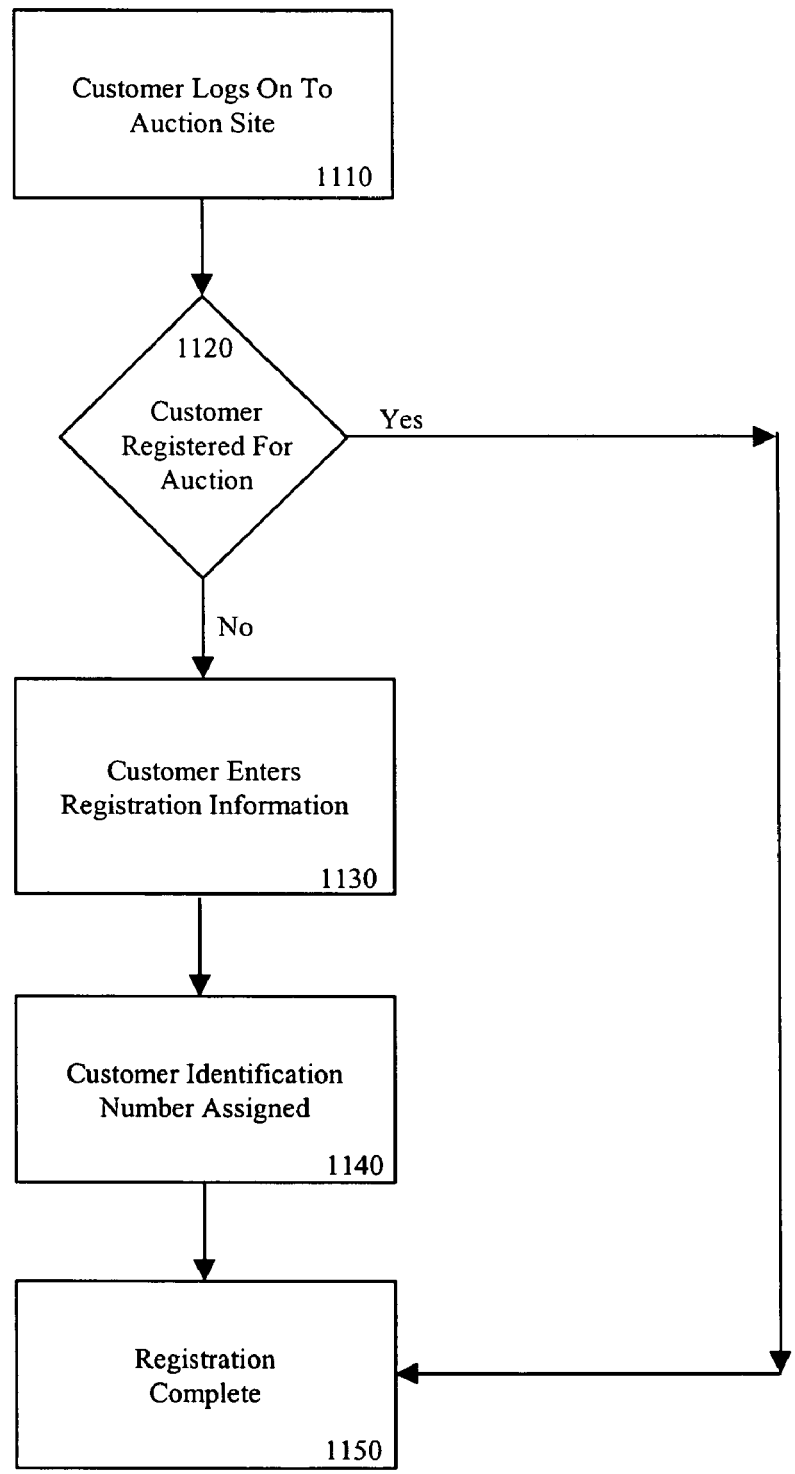
FIG. 11 shows an embodiment of a representative method for customer registration according to the system and method.

FIG. 11 shows the process by which a customer may register for use of the customer affinity program auction system and method. As shown in FIG. 11, the customer logs onto the auction site at step 1110. At step 1120, the customer is queried as to whether he has previously registered for the customer affinity program auction method and system. If so, the registration has previously been completed as shown at step 1150. If the customer has not previously registered, the customer enters registration information at step 1130. For example, as shown in the embodiment of the customer database 280 of FIG. 3, the customer may enter his name and address 330, personal identifier information 350 (e.g. mother's maiden name) and credit and/or debit card payment information 360 and 370. Password 320 may be selected by the customer or assigned by the system. Finally, the system will record the date the customer registered 340 and will assign a customer I.D. number 310 as shown at step 1140 of FIG. 11. The registration process is now completed as shown at step 1150.

Figure 12A:
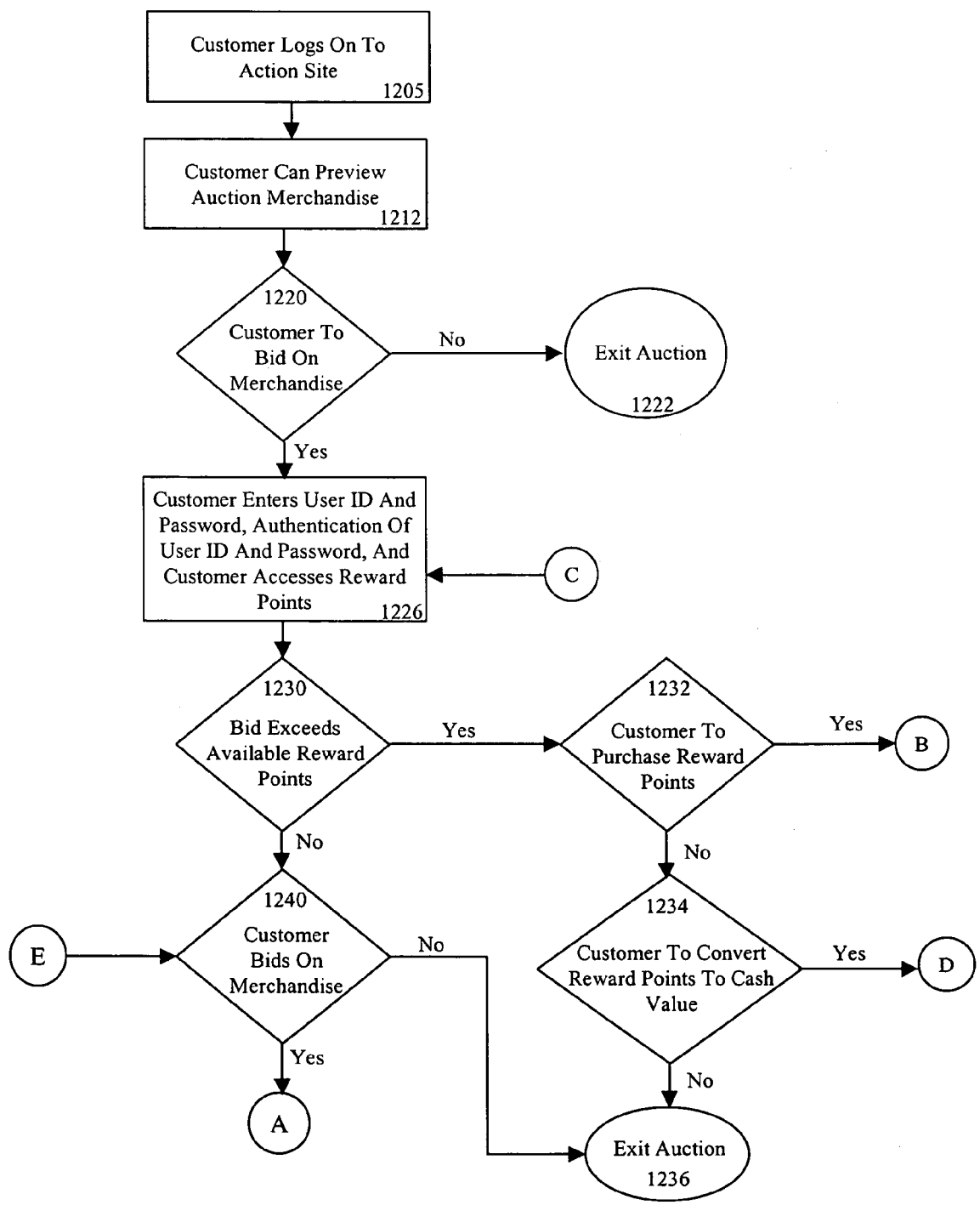
FIGS. 12A and 12B show an embodiment of a representative reward points auction according to the system and method.
Figure 12B:
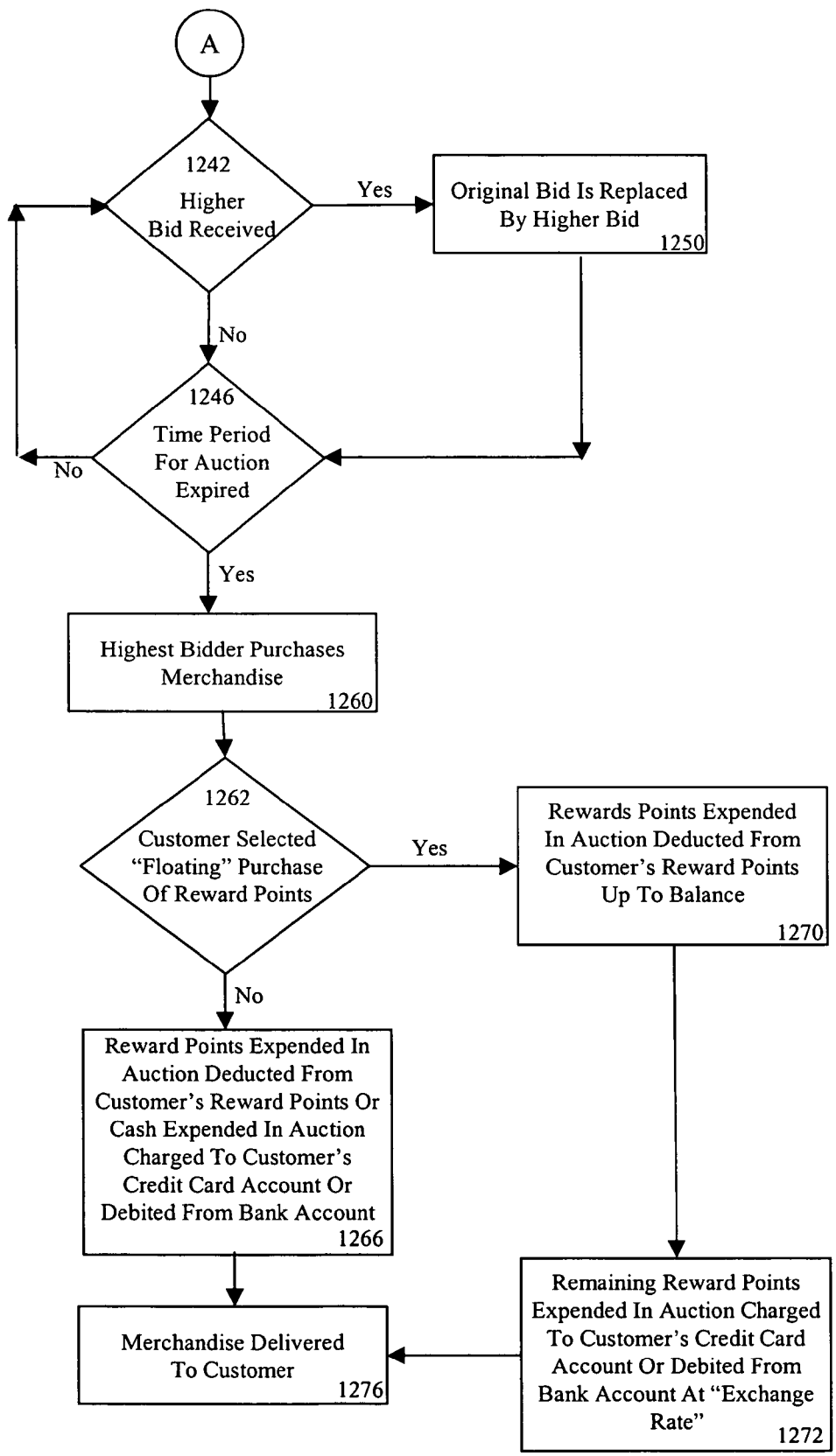

FIGS. 12A and 12B show operation of the system and method. The customer logs onto the auction site at step 1205. At this point the customer can preview auction merchandise at step 1212. This may include previewing merchandise that is on the auction block and currently being auctioned off. It also may include previewing merchandise that will be subject of upcoming auctions. To preview merchandise, the customer may access the embodiment of the merchandise database 284 as shown in FIG. 5. Merchandise database 284 may include an item code 510, a description of the item 520 and the number of units of that item that are available for purchase through the auction 530. The item code 510 is a number that facilitates tracking of particular items in the system and method. Merchandise database 284 may also include photographs or video clips of the items or promotional materials concerning the items being auctioned.

The customer is free to bid on any merchandise that is currently being auctioned as shown at step 1220 of FIG. 12A. If the customer decides not to do so, he may exit the auction site as shown at step 1222.

If the customer would like to bid on merchandise that is currently being auctioned, the customer enters his user I.D. number and password, that information is authenticated by the system and the customer may access its reward points as shown at step 1226. Accessing of the reward points involves transfer of data from the reward program central controller 130 to the auction site central controller 110 as shown in FIG. 1. As an example of the particular information that may be transferred from reward program central controller 130 to the central controller 110 and viewed by the customer, the embodiment of the reward points database 282 of FIG. 4 contains current reward points balance 430, additional non-provider reward points 440 and reward points available for purchase 450 based on the customer I.D. number 410 or name 420.

The current reward points balance 430 refers to reward points that the customer has earned through the customer affinity program, for example, through travel on airplanes or through purchases. Additional non-provider reward points 440 refers to reward points that the customer has earned through another qualified reward program that may be transferred and used in the reward points auction. Reward points available for purchase 450 refers to the upper limit of reward points the customer may purchase as part of the system and method.

If the customer has a sufficient number of points in its current reward points balance 430 to bid on the merchandise as shown at step 1230 of FIG. 12A, the customer may proceed to bid on the merchandise as shown at step 1240 or decide not to bid on the merchandise and exit the auction as shown at step 1236. If, however, the reward points required to bid on the merchandise exceeds the current reward points balance available to the customer 430 and additional non-provider reward points 440 available to the customer as shown at step 1230, the customer may decide to purchase additional reward points as shown at step 1232. Alternatively, if the customer decides not to purchase additional reward points, he may opt to convert his current reward points balance 430 and additional non-provider reward points 440 to a cash value for use in the auction as shown at step 1234. If the customer decides not to purchase reward points and not to convert reward points to a cash value, it may exit the auction as shown at step 1236.

Figure 13A:
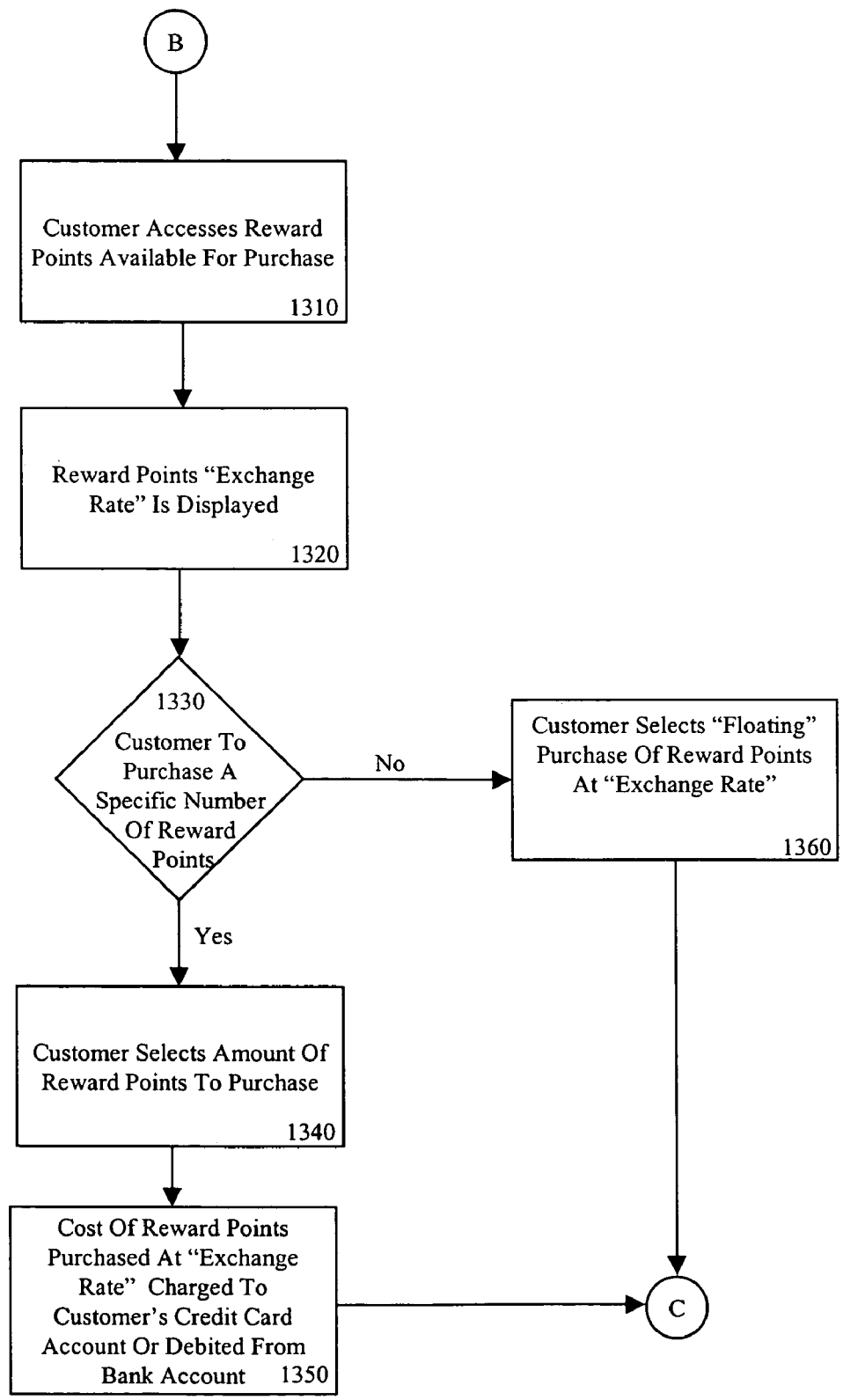
FIG. 13A shows an embodiment of purchasing reward points according to the system and method.

FIG. 13A shows the operation of the system and method with respect to the purchase of additional reward points. If he customer would like to purchase additional reward points, the customer accesses the reward points available for purchase as shown at step 1310. Currency database 290 of FIG. 8 participates in this process. Currency database 290 may include a customer I.D. number 810, a current reward points balance 820, reward points available for purchase 830, the cost of purchasing the reward points in various currency exchange rates, for example, U.S. dollars 840, Francs 850 or Euros 860. The exchange rate is merely the rate at which reward points may be purchased. In other words, how many dollars per point or how many units of another currency, for example, Francs or Euros per reward point. For example, as shown in currency database 290 of FIG. 8 the customer has 25,000 reward points available for purchase and, with respect to U.S. dollars, the exchange rate is 0.01 U.S. dollars per point as shown at column 840 such that the 25,000 reward points available for purchase may be purchased for 250.00 U.S. dollars. Similarly, as shown in columns 850 and 860, the exchange rate is 0.06 Francs per point and 0.01 Euro per point such that the 25,000 reward points available for purchase may be purchased for either 1,500 Francs or 250 Euro.

Returning to FIG. 13A, the desired reward points exchange rate is displayed as shown at step 1320. At this point the customer may opt to purchase a specific number of reward points for use in the auction as shown in step 1330. The customer then selects the amount of reward points to purchase in the desired currency as shown in step 1340. For example, the customer may decide to purchase the 10,000 reward points at an exchange rate of 0.01 U.S. dollars per point and thus purchase 10,000 reward points for $100.00. The cost of the reward points purchase at the exchange rate can then be charged to the customer's credit card account or debited from the customer's bank account as shown in step 1350.

However, the customer may decide not to purchase specific number of reward points but in fact leave the number of reward points to be purchased open or "floating" during the auction as shown at step 1360. The floating purchase of reward points means that however many reward points the customer expends in the auction beyond its available balance of reward points will be later charged to its credit card account or debited from its bank account at the appropriate exchange rate, up to a certain limit of reward points available for purchase. Once the customer has either purchased a specific quantity of additional awards points or selected a floating purchase of reward points at the exchange rate, the customer is returned to step 1226 in FIG. 12A to bid on the merchandise being offered.

Figure 13B:
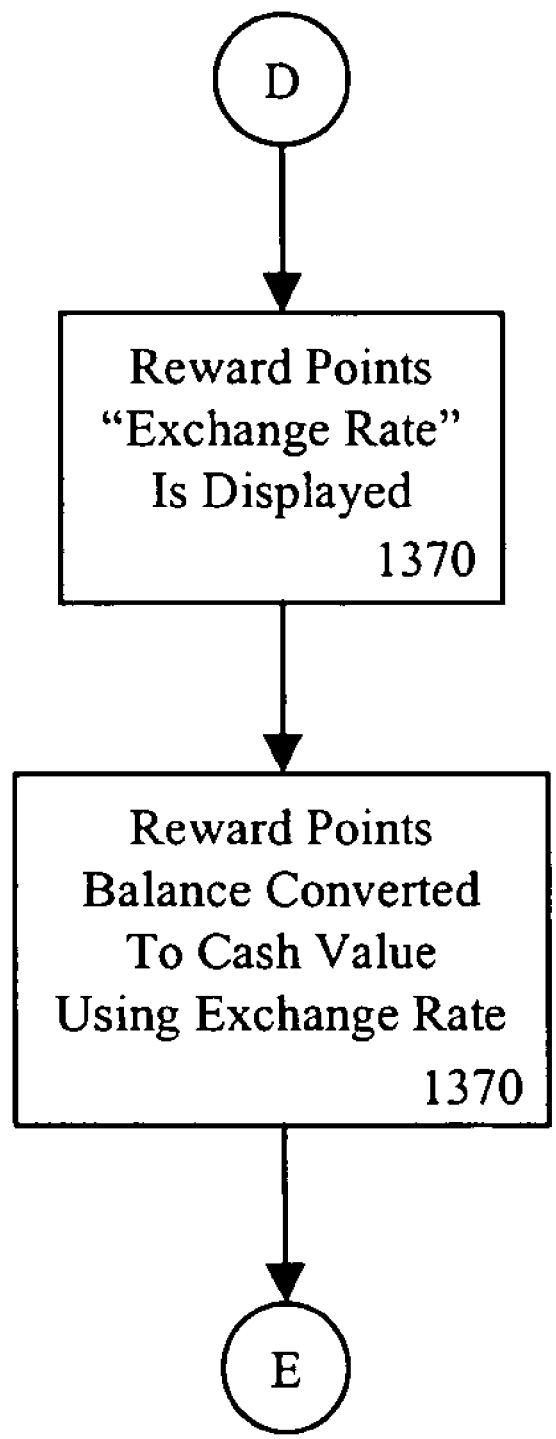
FIG. 13B shows an embodiment of converting reward points to a cash value according to the system and method.

FIG. 13B shows the operation of the system and method with respect to the conversion of reward points to a cash value for use in the auction. If the customer would like to convert reward points to a cash value for use in the auction, the reward points "exchange rate" is displayed as shown at step 1370. Currency database 290 of FIG. 8 participates in this process. The reward points balance is then converted to a cash value using the desired exchange rate as shown in step 1380. For example, the customer may decide to convert 10,000 reward points to a cash value at an exchange rate of 0.01 U.S. dollars per point to obtain $100.00 for use in the auction. The cash value of the reward points may then be used to bid on merchandise being offered in the auction. After converting reward points to a cash value, the customer is returned to step 1240 in FIG. 12A to bid on the merchandise being offered.

The customer may bid on merchandise as shown at step 1240 in FIG. 12A. The customer may bid in reward points, using reward points accumulated or purchased, or in cash, using a cash value of reward points as a portion of the total cash bid. The system keeps track of the customer's bids and other bids received as shown in the embodiment of the offer database 288 of FIGS. 7A and 7B. As shown in FIG. 7A, offer database 288 may include a customer I.D. number 710, an offer number 720, item code 730, a minimum opening bid 740, a bid increment 750, an opening bid date 760, an auction cutoff date 770, a customer opening bid 780 and a customer latest bid 790. As shown in FIG. 7B, the offer database 288 also may correlate the highest bid 792 to an offer number 794 and customer I.D. number 796.

If a higher bid is received as shown at step 1242, the original bid will be replaced by the higher bid in column 792 in offer database 7B as shown at step 1250. Whether or not a higher bid is received, the system will monitor whether the time period for the auction has expired as shown in step 1246. The system will monitor whether a higher bid has been received until the time period for the auction has expired. If the time period for the auction has expired as shown at step 1246, the highest bidder purchases the merchandise as shown at step 1260.

At this point the system queries whether the customer has selected the "floating" purchase reward points as shown at step 1262. If not, as shown at step 1266, if the bid was made in reward points, the reward points expended in the auction for purchase of the merchandise are deducted from the customer's reward points total shown in column 430 of FIG. 4, the reward points expended are then transmitted from the central controller 110 to the reward programs central controller 130 for debiting from the customer's reward points balance maintained by the central controller 130. If the bid was made in cash, the cash expended in the auction less the cash value of reward points exchanged by the customer are charged to the customer's credit card account or debited from the customer's bank account.

If, however, the customer had selected the floating purchase of reward points (step 1262), then the reward points expended in the auction are deducted from the customer's reward points balance up to the customer's current balance of reward points shown in column 430 of FIG. 4 as shown in step 1270. Any remaining reward points required to purchase the goods expended in the auction are charged to the customer's credit card account or debited from the customer's bank account at the exchange rate of the desired currency shown at step 1272.

At this point, the auction is complete and the merchandise can be delivered to the customer as shown at step 1276 in accordance with the information in the embodiment of the fulfillment database 294 of FIG. 10. Fulfillment database 294 may include the customer I.D. number 1010, a customer name and address 1020, the particular product 1030 and the method of delivery 1040.

Referring particularly to the embodiment of the customization database 292 of FIG. 9, the auction system and method as described above may be customized in various ways. Customization database 292 may include the customer I.D. number 910, a geographic code 920, a customer profession 930, customer interest 940 and previous reward points redemption 950. Customization database 292 is used to allow targeted auctions. For example, goods may be auctioned to customers in a particular geographic area as determined by a geographic code 920. Such an auction might be for the purchase of a sporting event ticket in the New York City area and may only be made available to customers in that area. Similarly, an auction may be customized, for example, by a consumer's profession 930 or a particular interest 940 or by keeping track of previous redemptions of reward points for particular products 950. In this manner, an auction may be limited to customer's having a certain interest or profession or previous history of reward points redemption. This is a way of generating particularized interest in the auction system and method.

Figure 14:
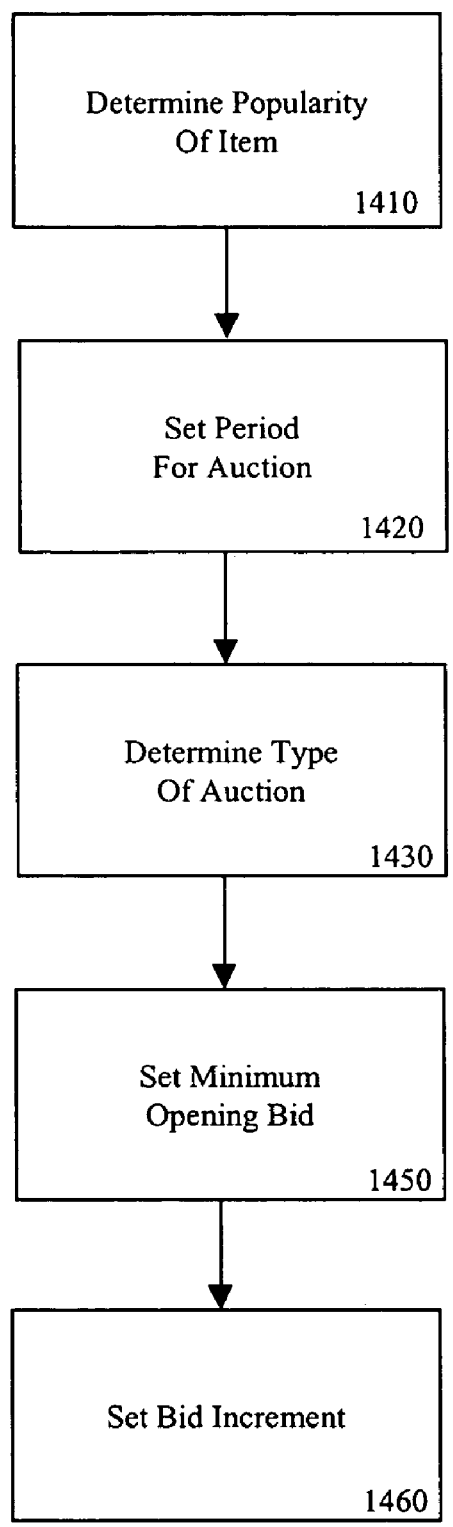
FIG. 14 shows an embodiment of determining the opening price and bid increment for an item according to the system and method.

FIG. 14 shows the method and system for setting the minimum opening bid price and the bid increment for use in the customer affinity program auction system and method. As shown in step 1410, the popularity of the item is determined. The time period for the auction is set as shown in step 1420. The type of auction is determined as shown in step 1430. Using the foregoing information, the system sets the minimum opening bid price at step 1450 and bid increment at step 1460.

The embodiment of pricing database 286 of FIG. 6 is used as part of this process to determine the opening bid price and bid increment. The pricing database may include an item code 610, a description of the item 620, the cost of the item to the provider of the system and method 630, the popularity of the item 640, the period of usage 650, the type of auction 660, an auction pricing discount factor 670, a minimum opening bid 680 and a bid increment 690. The popularity of the item 640 refers to the expected activity during the auction based on, for example, prior experience with the same or similar goods or general customer preferences. The period of usage 650 refers to the time that the auction will be taking place and typically how many customers are accessing the system during that time. The type of auction reflects flexible criteria that helps determine the minimum opening bid price and the bid increment. This can be determined again by the system and method based on prior history or by the operator of the system and method. For example, the type of good being sold may be a luxury item or the type of auction may be occurring during normal or peak usage times. The auction pricing discount factor 670 is the factor applied by the system and method to determine the minimum opening bid 680. The minimum bid 680 and bid increment 690 is expressed in reward points and a cash value (e.g. dollars as shown in FIG. 6).

For example as shown in the first row of FIG. 6 for a normal type auction a typical auction pricing discounting factor might be 60%. Multiplying the cost of the goods to the provider times the auction pricing discount factor divided by a determined reward points value, the system and method can arrive at a minimum opening bid price. For example as shown in the first column of FIG. 6, the cost of the sporting events ticket is $125.00 to the provider multiplying that times the auction pricing discount factor of 60% which was set based on it being a normal type auction during a moderate period of usage for a highly popular item and dividing that by 0.015 U.S. dollars per point, to arrive at a minimum opening bid of 5,000 points. Likewise the biding increment of 1000 points is set based on the fact that the type of auction is normal, the period of usage is moderate and the popularity item is high.

For other types of items, for example, luxury goods as shown in the third row of FIG. 6, the auction pricing discount factor can be set much higher. Alternatively, as shown in the second column of FIG. 6, when the period of usage for the auction is during the peak period, the type of auction is classified as a peak usage auction and auction pricing discount factor is 33% resulting in a much lower opening bid for the same goods as shown in the first row of FIG. 6. The rationale for this pricing scheme is that during periods of peak usage, more people will be biding on items on the auction block such that even at a lower opening bid price and a lower bid increment, the price will be driven up to an equilibrium level before the ultimate sale.

The above description of various preferred embodiments has been presented for purposes of illustration and description. It is not intended to be exhaustive or limiting to the precise forms disclosed. Obvious modifications or variations are possible in light of the above teachings. The embodiments discussed were chosen and described to provide illustrations and their practical application. All such modifications and variations are within the system as determined by the appended claims when interpreted in accordance with the breadth to which they are fairly, legally and equitably entitled.

We claim:

1. A method of conducting a customer affinity program auction, comprising:
    determining, using a central controller, a minimum opening bid price by:
        determining an auction pricing discount factor based at least on merchandise being auctioned and the time period of the auction;
        applying the auction pricing discount factor to a cost of the merchandise;
    setting the minimum opening bid price in reward points based on the determined minimum opening bid price; and
    receiving a bid of reward points from a customer using a computer terminal for the merchandise being offered in the auction.

2. The method of claim 1, further comprising:
    after the customer has logged into an auction site, querying the customer to determine whether the customer has previously registered for the customer affinity program auction;
    if the customer has not previously registered for the customer affinity program auction, receiving registration information from the customer through one or more customer interface devices connected to the central controller; and
    storing the registration information from the customer in a customer database maintained on a data storage device.

3. The method of claim 2, wherein the customer registration information includes payment information.

4. The method of claim 1, further comprising:
    providing, through one or more customer interface devices connected to the central controller, a preview of the merchandise being offered in the auction by retrieving merchandise information from a merchandise database maintained on a data storage device.

5. The method of claim 1, further comprising
    authenticating the customer by comparing a user identification of the customer and a password of the customer against information stored in a customer database maintained on a data storage device; and
    if the customer is authenticated, allowing the customer to access, through one or more customer interface devices connected to a reward program central controller through the central controller, a reward points balance stored in a reward point database maintained on the data storage device communicatively coupled to the reward program central controller.

6. The method of claim 5 further comprising
    allowing the customer to purchase additional reward points, through the one or more customer interface devices connected to the reward program central controller through the central controller, for use in the auction.

7. The method of claim 6, wherein the customer is allowed to purchase a specific number of reward points at an exchange rate.

8. The method of claim 7 further comprising determining a cost for the reward points purchased and transmitting a request for payment for the cost of the reward points based on information provided by a currency database maintained on the data storage device.

9. The method of claim 6, further comprising allowing a purchase of reward points on a floating basis.

10. The method of claim 1, further comprising:
    deducting reward points expended in the auction from a reward points balance stored in a reward point database maintained on a data storage device communicatively coupled to the reward program central controller.

11. The method of claim 9, further comprising:
    determining a cost for purchasing reward points expended in the auction in excess of the customer's reward points balance and transmitting a request for payment for the cost of the reward points.

12. A customer affinity program auction system, comprising:
    a central controller constructed to receive a bid of reward points from a customer for merchandise being offered in the auction;
    wherein said central controller is constructed to determine a minimum opening bid price by applying an auction pricing discount factor in reward points based at least on the merchandise being auctioned and the time period of the auction.

13. The system of claim 12, further comprising:
    the central controller is constructed to receive registration information from the customer.

14. The system of claim 13, wherein the customer registration information received by the central controller includes payment information.

15. The system of claim 12, further comprising:
    the central controller is constructed to provide a preview of the merchandise being offered in the auction.

16. The system of claim 12, further comprising
    the central controller is constructed to authenticate the customer and allow the customer to access a reward points balance.

17. The system of claim 16 further comprising
    the central controller is constructed to allow the customer to purchase additional reward points for use in the auction.

18. The system of claim 17, wherein the central controller is constructed to allow the customer to purchase a specific number of reward points at an exchange rate.

19. The system of claim 18 further comprising the central controller is constructed to determine a cost for the reward points purchased and transmits a request for payment for the cost of the reward points.

20. The system of claim 17, wherein the central controller is constructed to allow the customer to purchase reward points on a floating basis.

21. The system of claim 12, further comprising:
    the central controller is constructed to deduct reward points expended in the auction from a reward points balance.

22. The system of claim 20, further comprising:
the central controller is constructed to determining a cost for purchasing reward points expended in the auction in excess of the customer's reward points balance and transmitting a request for payment for the cost of the reward points.

23. Computer executable code stored on a computer readable medium for conducting a customer affinity program auction, comprising:
a module configured to receive a bid of reward points from a customer for merchandise being offered in the auction; and
a module configured to determine a minimum opening bid price by applying an auction pricing discount factor in reward points based at least on the merchandise being auctioned and the time period of the auction.

24. The computer executable code of claim 23, further comprising:
a module to receive registration information from the customer.

25. The computer executable code of claim 24, wherein the customer registration information includes payment information.

26. The computer executable code of claim 23, further comprising:
a module to provide a preview of merchandise being offered in the auction.

27. The computer executable code of claim 23, further comprising
a module to authenticate the customer; and
a module to allow the customer to access a reward points balance.

28. The computer executable code of claim 27 further comprising
a module to allow the customer to purchase additional reward points for use in the auction.

29. The computer executable code of claim 28, wherein the customer is allowed to purchase a specific number of reward points at an exchange rate.

30. The computer executable code of claim 29 further comprising a module to determine a cost for the reward points purchased and a module to transmit a request for payment for the cost of the reward points.

31. The computer executable code of claim 28, further comprising allowing a purchase of reward points on a floating basis.

32. The computer executable code of claim 23, further comprising:
a module to deduct reward points expended in the auction from a reward points balance.

33. The computer executable code of claim 31, further comprising:
a module to determine a cost for purchasing reward points expended in the auction in excess of the customer's reward points balance and a module to transmit a request for payment for the cost of the reward points.

34. A method of conducting a customer affinity program auction comprising:
determining, using a central controller, a minimum opening bid price by:
determining an auction pricing discount factor based at least on merchandise being auctioned and the time period of the auction;
applying the auction pricing discount factor to a cost of the merchandise;
setting the minimum opening bid price in reward points based on the determined minimum opening bid price.

35. The method of claim 34, further comprising:
determining a bid increment.

36. A customer affinity program auction system comprising:
a central controller constructed to determine a minimum opening bid price by applying an auction pricing discount factor in reward points based at least on merchandise being auctioned and the time period of the auction.

37. The system of claim 36, further comprising:
the central controller is constructed to determine a bid increment.

38. Computer executable code stored on a computer readable medium for conducting a customer affinity program auction, comprising:
a module configured to determine a minimum opening bid price by applying an auction pricing discount factor in reward points based at least on merchandise being auctioned and the time period of the auction.

39. The computer executable code of claim 38, further comprising:
a module to determine a bid increment.

40. A method of conducting a customer affinity program auction comprising:
determining, using a central controller, a minimum opening bid price by:
determining an auction pricing discount factor based at least on merchandise being auctioned and the time period of the auction;
applying the auction pricing discount factor to a cost of the merchandise;
setting the minimum opening bid price in reward points based on the determined minimum opening bid price; and
receiving a bid in cash from a customer using a computer terminal for the merchandise being offered in the auction,
wherein at least a portion of the bid is paid for by reward points converted to a cash value.

41. The method of claim 40, further comprising:
receiving registration information from the customer.

42. The method of claim 41, wherein the customer registration information includes payment information.

43. The method of claim 40, further comprising:
providing a preview of the merchandise being offered in the auction.

44. The method of claim 40, further comprising
authenticating the customer; and
allowing the customer to access a reward points balance.

45. The method of claim 40 wherein the reward points are converted to a cash value using an exchange rate.

46. A customer affinity program auction system, comprising:
a central controller constructed to receive a bid in cash from a customer for merchandise being offered in the auction,
wherein said central controller is constructed to determine a minimum opening bid price by applying an auction pricing discount factor in reward points based at least on the merchandise being auctioned and the time period of the auction, and
wherein at least a portion of the bid is paid for by reward points converted to a cash value.

47. The system of claim 46, further comprising:
the central controller is constructed to receive registration information from the customer.

48. The system of claim 47, wherein the customer registration information includes payment information.

49. The system of claim 46, further comprising:
the central controller is constructed to provide a preview of the merchandise being offered in the auction.

50. The system of claim 46, further comprising
the central controller is constructed to authenticate the customer and allow the customer to access a reward points balance.

51. The system of claim 46 wherein the central controller is constructed so that the reward points are converted to a cash value using an exchange rate.

52. Computer executable code stored on a computer readable medium for conducting a customer affinity program auction, comprising:
a module configured to receive a bid in cash from a customer for merchandise being offered in the auction, and
a module configured to determine a minimum opening bid price by applying an auction pricing discount factor in reward points based at least on the merchandise being auctioned and the time period of the auction,
wherein at least a portion of the bid is paid for by reward points converted to a cash value.

53. The computer executable code of claim 52, further comprising:
a module to receive registration information from the customer.

54. The computer executable code of claim 53, wherein the customer registration information includes payment information.

55. The computer executable code of claim 52, further comprising:
a module to provide a preview of the merchandise being offered in the auction.

56. The computer executable code of claim 52, further comprising
a module to authenticate the customer; and
a module to allow the customer to access a reward points balance.

57. The computer executable code of claim 52 wherein the module converts reward points to a cash value using an exchange rate.

* * * * *